United States Patent [19]

Lunardon et al.

[11] Patent Number: 5,530,033
[45] Date of Patent: Jun. 25, 1996

[54] PROCESS FOR PREPARING FORMED ARTICLES MADE OF POLYURETHANE FOAMS AND FORMED ARTICLES SO OBTAINED

[75] Inventors: Gianflavio Lunardon, Padua; Corrado Cecchini, Salzano; Luciano Ciriello, Chioggia; Vito Cancellier, San Doná di Piave, Italy

[73] Assignee: ECP Enichem Polimeri s.r.l, Milan, Italy

[21] Appl. No.: 441,644

[22] Filed: May 15, 1995

Related U.S. Application Data

[63] Continuation of Ser. No. 127,518, Sep. 28, 1993, abandoned, which is a continuation of Ser. No. 764,767, Sep. 24, 1991, abandoned.

[30] Foreign Application Priority Data

Sep. 26, 1990 [IT] Italy ....................... 21580/90

[51] Int. Cl.$^6$ ................................................. C08G 18/32
[52] U.S. Cl. .................... 521/131; 521/155; 521/159; 521/163; 521/174
[58] Field of Search ................... 521/131, 155, 521/159, 163, 174

[56] References Cited

U.S. PATENT DOCUMENTS

| | | | |
|---|---|---|---|
| 4,289,858 | 9/1981 | Koehler et al. | 521/131 |
| 4,931,482 | 6/1990 | Lamberts et al. | 521/131 |
| 4,972,002 | 11/1990 | Volkert | 521/120 |
| 4,997,706 | 3/1991 | Smits et al. | 521/131 |
| 5,164,418 | 11/1992 | Behme et al. | 521/131 |

FOREIGN PATENT DOCUMENTS

| | | |
|---|---|---|
| 0345580 | 12/1989 | European Pat. Off. . |
| 0351614 | 1/1990 | European Pat. Off. . |
| 0432672 | 6/1991 | European Pat. Off. . |
| 0450308 | 10/1991 | European Pat. Off. . |

OTHER PUBLICATIONS

G. Oertel; *Polyurethane Handbook;* 1985; p. 169.

*Primary Examiner*—James J. Seidleck
*Assistant Examiner*—R. F. Johnson
*Attorney, Agent, or Firm*—Oblon, Spivak, McClelland, Maier & Neustadt

[57] ABSTRACT

A process for preparing formed articles made of polyurethane foams, which comprises reacting at least a polyisocyanate with at least a compound containing end activated hydrogens in the presence of an expanding medium, selected from at least a hydrofluoroalkane and/or perfluoroalkane, and of a product, containing at least a structural unit of the aminic type, chemically bound or present in free form in one of the two polyurethane reagents, said expanding medium being dissolved in said one of the two polyurethane reagents.

15 Claims, No Drawings

PROCESS FOR PREPARING FORMED ARTICLES MADE OF POLYURETHANE FOAMS AND FORMED ARTICLES SO OBTAINED

This application is a Continuation of application Ser. No. 08/127,518, filed on Sep. 28, 1993, abandoned, which is a continuation of application Ser. No. 07/764,767, filed on Sep. 24, 1991, abandoned.

The present invention relates to a process for preparing formed articles made of polyurethane foams and to the formed articles so obtained.

The term "polyurethane foams", whenever used in the present specification and in the appended claims, means both the rigid polyurethane foams and the flexible, soft or extra-soft and elastic polyurethane foams.

The polyurethane foams are utilized for several appliances and are produced by reacting a formulated polyol with a polyisocyanate, in particular 2.4/2.6-toluene diisocyanate (TDI) or 4,4'diphenylmethane diisocyanate (MDI) and higher homologouses or modifications thereof, using, as expanding agents, monofluorotrichloromethane, which is known by those skilled in the art as CFC 11, or other halogenated or hydrohalogenated chlorine-containing hydrocarbons.

A few of such expanding agents, in particular CFC 11, have been included in the Montreal Protocol in the list of the fluroalkanes considered as harmful to the environment as they contribute to alter and to destroy the ozone layer present in the stratosphere. Other expanding agents such as difluoromonochloromethane are debated as they exhibit an ODP (Ozone Depletion Potential) higher than zero. Therefore, a gradual elimination of them has become necessary.

A way followed at present is the generalized recourse to the expansion with $CO_2$ generally coming from the isocyanate-water reaction.

However, the use of high water concentrations in the formulates, and consequently of $CO_2$ in the foams, results in considerable drawbacks:

a) in the rigid foams:

higher starting thermal conductivity;

quicker increase in the thermal conductivity in the course of time owing to the higher $CO_2$ permeability through the polymer with consequent inlet of air;

dimensional unstability of the foam in hot conditions;

higher surface friability with consequent problems concerning the adhesion to various substrates;

higher exothermicity of the isocyanate-polyol reaction with consequent deformation phenomena of the manufactured articles;

higher isocyanate consumption;

b) in the flexible foams:

higher exothermicity with possible thermal degradation phenomena of the polymer;

greater problems regarding the water compatibility in the system with consequent unbalances between the foaming and the polymer formation reactions and possible collapse and breaking phenomena in the foams;

higher isocyanate consumption;

difficulty in obtaining low bearing capacity and low density foams (D≦35 kg/m and bearing capacity≦150N at 40% of compression according to ISO 2439 standard);

impossibility of obtaining "integral skin" foams.

An alternative to the $CO_2$ coming from the isocyanate-water reaction was the use of liquid $CO_2$ in admixture with one or both polyurethane reagents. However, this solution gave little appreciable results.

To obviate these drawbacks it is necessary to find out foaming agents, which are an alternative to the chlorine-containing halogenated or hydrohalogenated hydrocarbons now in use, and the utilization of which is not limited by the Montreal Protocol or by other agreements.

Another essential condition is that such new foaming agents should be utilizable by means of industrial technologies not different from the ones used in the present practice, and that the properties of the final polyurethanes should not be lower than the ones of the polyurethanes obtained, for example, with CFC 11.

The published European patent application 351,614 describes the preparation of polyurethane foams in the presence of non-harmful foaming agents selected from perfluorinated alkanes having a number of carbon atoms higher than 3 and boiling temperatures consistent with polymerization temperatures of the foams. However, these perfluoroalkanes exhibit a low efficiency as foaming agents since—because of the fact that they are not dilutable in any of the polyurethane reagents—they must be emulsified mechanically and using stabilizers of complex nature and utilized in this form as foaming agents. Furthermore, owing to their low efficiency as foaming agents, they require high amounts of water as an expanding co-agent.

The Applicant has now found a process for preparing polyurethane foams which permits to utilize, as an expanding medium, products—like those of the art—which are not included in the Montreal Protocol or in other agreements as they do not contain chlorine, and which, besides not being affected by the drawbacks associated with the use of considerable amounts of $CO_2$ and besides meeting all the above cited requirements, can be easily dissolved in said one of the two polyurethane components. In fact it has been found that the presence of products, containing structural units of the aminic type, either chemically bound or present in the free form (i.e. merely mixed), in said one of the two polyurethane reagents, permits to promptly dissolve fluorinated hydrocarbons (alkanes) not containing chlorine, in amounts sufficient to produce foams of excellent quality.

Thus, an object of the present invention is a process for preparing formed articles made of polyurethane foams, which comprises reacting at least a polyisocyanate with at least a compound containing end activated hydrogens in the presence of an expanding agent, which comprises at least a hydrofluoroalkane and/or a perfluoroalkane, and of a product, containing at least a structural unit of the aminic type, chemically bound or present in the free form in one of the two polyurethane reagents, said expanding agent being dissolved in said one of the two polyurethane reagents.

The expanding agent, which contains at least a hydrofluoroalkane and/or a perfluoroalkane, can be dissolved in the polyisocyanate and/or in the compound containing end activated hydrogens, however, according to a best embodiment of the process of the present invention, the foaming agent is dissolved in the compound containing end activated hydrogens.

The expanding agent is added to one of the polyurethane components in amounts which are a function of the type of polyurethane foam to be produced. Amounts higher than 1 part by weight per 100 parts of polyurethane component and generally ranging from 5 to 50 parts are, however, the most suitable.

Products which, according to the present invention, contain structural units of the aminic type are the following:

i) hydroxy-terminated polyols having a molecular weight ranging from 500 to 8,000, obtained from aminic starters of the aliphatic, cycloaliphatic, aromatic type containing 1 to 12 carbon atoms, condensed with $C_1$–$C_6$ alkyl oxides. Examples of aminic starters are ethylenediamine, propylenediamine, cyclohexyldiamine, toluenediamine, etc., while examples $C_1$–$C_6$ alkyl oxides are ethylene oxide, propylene oxide, etc. A few of said polyols are known under the tradenames GLENDION RM 0400 produced by Montedipe, or DALTOLAC 50 produced by Imperical Chemical Industries (I.C.I.);

ii) amino-alcoholic chain extenders or cross-linking agents of the aliphatic, cycloaliphatic, aromatic type containing 1 to 12 carbon atoms, such as ethanolamine, diethanolamine, triethanolamine, N,N-diethanolaniline, etc.;

iii) non-reactive products such as diethanoamine dimethylether, triethanolamine triethylether, etc.

More in particular, preferred products containing structural units of the aminic type are the ones of general formula:

where:

X represents a hydrogen atom or one of groups $Z_1$—$R_2$— or $Z_2$—$R_1$—;

$Z_1$ and $Z_2$, like or different from each other, represent a hydrogen atom, or a group OH, - - - $NH_2$, $NHR_3$, where $R_3$ represents an alkyl, cycloalkyl, aryl, alkylaryl radical having 1 to 12 carbon atoms;

$R_1$ and $R_2$, like or different from each other, represent an alkylene, cycloalkylene, arylene, alkylarylene radical containing 1 to 20 carbon atoms, or polyoxyalkylene chains having an average molecular weight from 60 to 8,000, in which the alkylene group contains 1 to 4 carbon atoms.

The product, containing at least a structural unit of the aminic type, either used in the free form or chemically bound, is utilized in such amounts that the aminic group is present at a concentration of at least 0.03 moles, preferably higher than 0.05 moles, per 100 g of the component in which the foaming agent is dissolved and up to 1 mole per 100 g.

Any method suited to dilute the foaming agent in one of the polyurethane reagents can be utilized in the process of the present invention.

For example, the dissolution step can be conducted in a closed vessel, by operating continuously, semicontinuously or discontinuously at room temperature and feeding the hydrofluoroalkane and/or perfluoroalkane in the liquid state.

The admixture can take place either under mild stirring for long stretches of time of the order of 2–4 hours, or under quick and turbulent stirring for times below 40 minutes, for example from 10 to 40 minutes, using high specific energy mixers.

The admixture of the foaming agent can be carried out directly in the mixing head of a foaming machine.

In particular, a process for preparing formed articles made of polyurethane foams comprises the step of reacting at least a component based on a polyisocyanate with at least a second component based on a compound containing end activated hydrogens in the presence of a foaming medium and of a product containing at least a structural unit of the aminic type chemically bound or present in the free form in one of the two polyurethane reagents, in which said foaming medium comprises at least a hydrofluoroalkane and/or a perfluoroalkane dissolved in said one of the two polyurethane reagents, the dissolution of the foaming agent being carried out by means of stirring in a closed vessel under a starting pressure close to the feeding pressure of said foaming agent and in which stirring is maintained and carried on, either continuously or discontinuously, for a time sufficient to cause a pressure decrease by absorption of the foaming agent in the polyurethane component.

The use of hydrofluoroalkanes or of perfluoroalkanes as foaming agents for polyurethane foams, according to the present invention, can be considered as really surprising as these products, although they have boiling points—at ambient pressure—even lower than 0° C. and although they are hardly soluble under the conditions usually described in the art, give rise to homogeneous stable mixtures which, above all, exhibit a low vapor tension, generally lower than 4 bars. Therefore, these mixtures can be stored for relatively long stretches of time and can be transferred without difficulty into the feeding tanks of the foaming machines, wherefrom they are withdrawn for being reacted, by means of any technology, in the production of homogeneous articles endowed with an excellent density. Examples of technologies which are utilizable in combination with the process of the present invention are the ones described, for example, in "Saunders and Frisch—Polyurethanes, Chemistry and Technology", Interscience, New York, 1964.

Rigid and non-rigid foams at any density, produced according to the well-known Reaction Injection Moulding technology (RIM) or according to the frothing technology, can be also obtained by the process described herein.

Under the conditions of the present process, the foaming agent loss is extremely low; in fact, as it is efficaciously retained, it leads to a regular foaming with obtainment of foams having a regular cellular structure and improved physico-mechanical characteristics, as to homogeneity and low dispersion of the data, as compared with those obtained under conditions in which the homogenization of the hydrofluoroalkane and/or perfluoroalkane in one of the two reagents is not complete.

In particular, as regards the rigid foams, in comparison with not best modalities of use of the foaming agent of the present invention, the following is obtained:

higher flowability of the foam with consequent easy filling of the voids;

lower thermal conductivity of the foam, with values similar to the ones obtainable with CFC 11;

higher stability of the foam in hot conditions;

increase, in the time, of the thermal conductivity, comparable with the one of foams foamed by means of CFC 11.

Any organic polyisocyanate capable of providing polyurethane foams can be utilized in the embodiment of the present invention, although aliphatic, cycloaliphatic, aromatic polyisocyanates and the corresponding alkyl-substituted derivatives are preferred.

In particular it is possible to use low molecular weight diisocyanates having general formula:

where R is an aliphatic, a cycloaliphatic, an aromatic, optionally alkyl-substituted radical having 1 to 30 carbon atoms, such as 2,2,4-trimethylhexamethylene diisocyanate, ethylidene diisocynate, butylene diisocyanate, hexamethylene diisocyanate, cyclohexylene-1,4-diisocyanate, cyclohexylene-1,2-diisocyanate, dichlorohexamethylene diisocyanate, xylylene diisocyanate, meta and/or para-phenylene diisocyanate, 2,4-toluene diisocyanate alone or in admixture with its isomer 2,6-toluene diisocyanate, 4,4'-diphenylmethane diisocyanate, optionally in admixture with its isomer 2,4', 4,4'-dicyclohexylmethane diisocyanate, 1-isocyanate-3-isocyanatemethyl-3,3,5-trimethylcyclohexane (or isophorone diisocyanate), etc.

A preferred diisocyanate of general formula (I) is 2,4-toluene diisocyanate (TDI) either alone or in admixture with at least 20% by weight of isomer 2,6 and 4,4'-diphenylmethane diisocyanate (MDI) either alone or in admixture with at least 5% by weight of isomer 2,4'.

A non-distilled or rough toleuene diisocyanate, i.e. a partially purified toluene diisocyanate extracted from any distillation column tray, can be usually utilized.

As an alternative, it is possible to use mean or high molecular weight polyisocyanates having different condensation degree and obtained from the phosgenation of aniline-formaldehyde condensates. These products consist of mixtures of polymethylene-polyphenyl polyisocyanates having general formula:

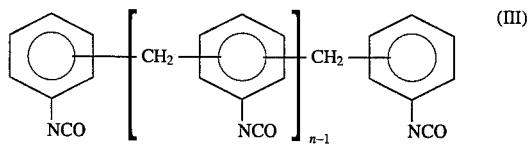

(III)

where n represents an integer higher than or equal to 1.

Preferred mean or high molecular weight polyisocyanates are the mixtures of polymethylene-polyphenyl polyisocyanates having a mean functionality of 2,6–2,8; such products are marketed under various names such as "Tedimon 31" produced by Montedipe, "Suprasec DNR" produced by ICI, or "Desmodur 44 V2U" produced by Bayer.

Further examples of polyisocyanates utilized in the process of the present invention are the isocyanic prepolymers prepared by reacting the polyisocyanates of formulas (II) and (III) with an equivalent defect of:

a) polyols, polyethers or polyesters, having a hydroxyl or aminic functionality of at least 2 and a mean molecular weight ranging from 60 to 8,000; and/or b) reactive products of general formula (I).

The compound containing end activated hydrogens, is preferably composed of at least a polyether polyol or a polyester polyol containing aliphatic, cycloaliphatic aromatic $C_2$–$C_{20}$ chains. Examples of polyether polyols are the ones at low molecular weight containing at least two activated hydrogen atoms such as glycols, triols, tetraols, polyamines and alkanolamines of general formula (I), or mixtures thereof. Illustrative examples are dipropylene glycol, 1,4-butylene glycol, glycerine, trimethylolpropane, pentaerythritol, sorbitol, ethylenediamine, triethanolamine, etc.

Further examples of polyols are the polyether polyols having a high molecular weight, for example from 500 to 8,000, and a hydroxyl or aminic functionality of at least 2, obtained from the condensation of $C_2$–$C_6$ oxides on starters having at least two activated hydrogen atoms like the ones listed hereinabove. Preferred high molecular weight polyols are the ones obtained from reactive aminic starters of general formula (I) condensed with ethylene oxide and/or propylene oxide, optionally in admixture with other polyols obtained from the condensation of ethylene oxides and/or propylene oxides on starter of the non-aminic type.

The hydrofluoroalkanes and/or perfluoroalkanes utilized in the process of the present invention are preferably the ones having a low number of carbon atoms, for example 1 or 2 carbon atoms. Examples of such products are: 1,1,1,2-tetrafluoroethane (boiling point (b.p.) −24° C.), pentafluoroethane (b.p. −48.5° C.), trifluoromethane (b.p. −82° C.), 1,1,2-trifluoroethane (b.p. −0.5° C.), 1,1-difluoroethane (b.p. −24.7° C.), 1,2-difluoroethane (b.p. +30.7° C.), monofluoroethane (b.p. −37.1° C.), tetrafluoromethane (b.p. −128° C.), hexafluoroethane (b.p. −78.2° C.) etc., or isomers thereof.

Preferred product for the process of the present invention is 1,1,1,2-tetrafluoroethane.

In addition to the above-mentioned components, further additives can be present such as, for example, catalysts, stabilizers, pigments, crosslinking agents, other expanding media such as water, liquid $CO_2$, etc. the use whereof is illustrated and described in literature in "Saunders and Frisch—Polyurethanes, Chemistry and Technology", Interscience, New York, 1964.

Thus, another object of the present invention is represented by formed articles made of polyurethane foams obtained by reacting of least a polyisocyanate with at least a compound containing end activated hydrogens, in the presence of an expanding medium, which comprises at least a hydrofluoroalkane and/or a perfluoroalkane, and of a product, containing at least a structural unit of the aminic type, chemically bound or present in free form in one of the two polyurethane reagents, said expanding medium being dissolved in said one of the two polyurethane reagents.

Preferred articles made of polyurethane foams are those obtained in the presence of an expanding medium, which can comprise also water.

The formed articles object of the present invention are utilized in the sectors of refrigeration, thermal insulation, furnishings, transports, electric housedold appliances, office machines and the like.

Examples of formed articles according to the present invention are insulating structures, panels, casings for electric household appliances or office machines, seats for furnishings or transport, armrests for chairs and armchairs, inner components for motor-cars such as head-rests and instrument boards, etc.

In particular, the formed articles made of polyurethane foams representing the object of the present invention are all the articles usually obtainable by means of CFC 11, for example the ones obtainable from a continuous or discontinuous block, the molded, semirigid, low, mean and high density articles, which are optionally classifiable also in the sector of the microcellular elastomeric products, RIM products, and "integral skin" products, etc.

The formed articles of the present invention are preparable by continuous, discontinuous or semicontinuous methods and exhibit, in comparison with analogous articles manufactured from foams expanded only with $CO_2$, the following advantages:

a) in the field of the rigid foams:

drastic reduction in the polymerization process exothermicity;

lower polyisocyanate consumption;

absence of surface friability of the foam and higher adhesion to the substrates;

dimensional stability of the foam under the action of heat;

lower starting thermal conductivity;

lower increase in the thermal conductivity in the long run (which is of the same order of magnitude as that of the articles obtained with CFC 11);

b) in the field of the flexible foams:

a more regular and homogeneous formation of the foams with open cells and high transpirability;

possibility of obtaining low density and low bearing capacity foams, i.e. having a density (D) $\leq 35$ kg/m$^3$ and a bearing capacity $\leq 150$N at 40% of compression, according to standard ISO 2439;

low or no risk of thermal degradation;

possibility of obtaining polyurethane surface thickenings, - - - which are typical of the "integral skin" foams;

elimination of any problem connected with the compatibility between water and reactive system.

For a better understanding of the present invention and for carrying it into effect, a few illustrative, but not limitative examples are given hereinafter, in which, unless otherwise specified, all indicated parts are parts by weight.

EXAMPLE 1

A polyol composition containing:

a) 80 parts by weight of a conventional polyether polyol based on sorbitol (starter) and propylene oxide, having a number of OH equal to 490 mg KOH/g;

b) 20 parts by weight of a polyol obtained from the condensation of a propylene oxide on ethylenediamine, having a number of OH equal to 560 mg KOH/g; and c) 2 parts of water;

was introduced into a tank equipped with a helical screw agitator and suited to contain mixtures under pressure.

28 parts of liquid 1,1,1,2-tetrafluoroethane were added and solubilized in the polyol composition (starting pressure=6 bars) at a temperature of about 20° C.

After 1 hour, the pressure decreased to about 3.5 bars.

On conclusion of the expanding medium solubilization, the polyol mixture in homogeneous and stable phase was transferred into the tank of a high pressure foaming machine.

130 parts of this mixture were reacted with 157 parts of polymeric MDI (Tedimon 31 produced by Montedipe) in the presence of an aminic catalyst and a silicone surfactant, according to conventional methods, thereby obtaining, in a closed mould, a rigid closed-cell polyurethane foam having the following characteristics:
density=35 kg/m³ density in free growth=24 kg/m³
maximum compression strength=157 KPa
closed cells=94%
compression strength at 10% of deflection=125 KPa
thermal conductivity=0.0210 W/m °K.

EXAMPLE 2 (COMPARATIVE)

There was utilized a composition analogous with the one of example 1, but free from the polyol having structural units of the aminic type, adding, into the foaming machine tank, at a temperature of 20° C., 20 parts, calculated on the polyol, of liquid 1,1,1,2-tetrafluoroethane. It was observed that also after very long times (15 hours) the pressure decreased only slightly as compared with the starting pressure, wherefore the system was caused to react when the pressure in the tank was still of about 6 bars.

In a further test utilizing the same formulation, 1,1,1,2-tetrafluoroethane was directly fed to the mixing head of the foaming machine.

In both cases, non-homogeneous rigid foams of coarse appearance were obtained, which were not suitable for industrial uses.

EXAMPLE 3

100 parts of a polyether triol (starter: glycerine) based on propylene oxide and ethylene oxide, having a number of OH equal to 28 mg KOH/g and having about 15% of end primary hydroxyls, were mixed with 12.5 parts of a polyol, obtained from the condensation of orthotoluenediamine (starter) with propylene and ethylene oxide, having a OH number equal to 300, with 3.2 parts of water and with 12 parts of liquid 1,1,1,2-tetrafluoroethane in a stirred container capable of maintaining mixtures under pressure (starting pressure of about 6 bars).

After about 0.5 hours the pressure decreased to 2.5 bars and the whole was transferred into the tank of a high pressure foaming machine.

127.7 parts of this mixture were reacted with 44 parts of a 70/30 mixture of polymeric TDI/MDI (Tedimon 80/ Tedimon 31 produced by Montedipe) in the presence of aminic catalyst and cell regulator, according to conventional methods, and they were poured into a mould for the production of motor-car seats, maintained at a temperature of 45° C.

After about 5 minutes, an article having the required shape, dimensions and weight was withdrawn; it exhibited the following physical properties:
density=40 kg/m³
density in free growth=25 kg/m³
bearing capacity at 40% of compression (ISO 2439)=110N
elongation at break=100%
compression set (22 h×70° C. at 50% RH)=9%
open cells=80%
resilience (ball rebound)=50%
sag factor=3

We claim:

1. A process for preparing a polyurethane foam, comprising:

predissolving at least one part by weight of a hydrofluoroalkane and/or perfluoroalkane having one or two carbon atoms in 100 parts by weight of a polyether polyol and an amine having the formula (I):

where:

X represents a hydrogen atom or one of the groups $Z_1$—$R_2$— or $Z_2$—$R_1$;

$Z_1$ and $Z_2$ independently represent a hydrogen atom or an OH, $NH_2$ or $NHR_3$ group, where $R_3$ represents an alkyl, a cycloalkyl, an aryl or an alkylaryl radical having 1 to 12 carbon atoms; and $R_1$ and $R_2$ independently represent an alkylene, a cycloalkylene, an arylene or an alkylarylene radical having 1 to 20 carbon atoms or a polyoxyalkylene chain having an average molecular weight of from 60 to 8,000 in which the alkylene group of the polyoxyalkylene chain has 1 to 4 carbon atoms, in a closed vessel by stirring sufficiently to provide a homogeneous mixture, said homogeneous mixture consisting essentially of (i) said hydrofluoroalkane and/or perfluoroalkane, (ii) said polyether polyol and (iii) said amine in an amount providing at least 0.03 mol of aminic groups per 100 grams of said polyether polyol, and reacting said homogeneous mixture with a polyisocyanate.

2. A process for preparing a polyurethane foam, comprising:

predissolving at least one part by weight of a hydrofluoroalkane and/or perfluoroalkane having one or two carbon atoms in 100 parts by weight of a polyisocyanate and an amine having the formula (I):

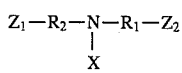

where:

X represents a hydrogen atom or one of the groups $Z_1$—$R_2$— or $Z_2$—$R_1$;

$Z_1$ and $Z_2$ independently represent a hydrogen atom or an OH, $NH_2$ or $NHR_3$ group, where $R_3$ represents an alkyl, a cycloalkyl, an aryl or an alkylaryl radical having 1 to 12 carbon atoms; and $R_1$ and $R_2$ independently represent an alkylene, a cycloalkylene, an arylene or an alkylarylene radical having 1 to 20 carbon atoms or a polyoxyalkylene chain having an average molecular weight of from 60 to 8,000 in which the alkylene group of the polyoxyalkylene chain has 1 to 4 carbon atoms, in a closed vessel by stirring sufficiently to provide a homogeneous mixture, said homogeneous mixture consisting essentially of (i) said hydrofluoroalkane and/or perfluoroalkane, (ii) said polyisocyanate and (iii) said amine in an amount providing at least 0.03 mol of aminic groups per 100 grams of said polyisocyanate, and reacting said homogeneous mixture with a polyether polyol.

3. The process of claim 1, said process consisting essentially of said predissolving and said reacting steps.

4. The process of claim 2, said process consisting essentially of said predissolving and said reacting steps.

5. The process according to claim 1, wherein the polyisocyanate is selected from the group consisting of low molecular weight diisocyanates of the formula:

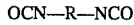

where R represents an aliphatic, a cycloaliphatic, an aromatic, or an alkyl-substituted aromatic radical having 1 to 30 carbon atoms.

6. The process according to claim 1, wherein the polyisocyanate consists essentially of a mixture of polymethylene-polyphenyl polyisocyanates having the formula (III):

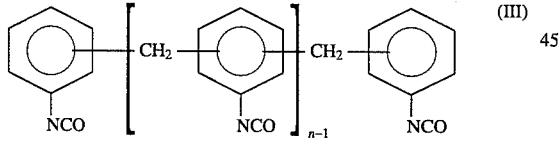

wherein n represents an integer higher than or equal to 1.

7. The process according to claim 1, wherein the polyether polyol contains an aliphatic, a cycloaliphatic, or an aromatic $C_2$-$C_{20}$ chain.

8. The process according to claim 1, wherein the hydrofluoroalkane and/or perfluoroalkane is 1,1,1,2-tetrafluoroethane.

9. The process according to claim 1, wherein said predissolving step further comprises predissolving water in said polyether polyol.

10. The process according to claim 1, wherein said hydrofluoroalkane and/or perfluoroalkane has a feed pressure, said closed vessel has a starting pressure close to said feed pressure, and after said predissolving step, said homogeneous mixture has a vapor pressure lower than 4 bars.

11. The process of claim 1, wherein said hydrofluoroalkane and/or perfluoroalkane is liquid, and said process further comprises the step of feeding said liquid hydrofluoroalkane and/or perfluoroalkane into said closed vessel.

12. A process for preparing formed articles made of a polyurethane foam, comprising pouring a polyurethane foam prepared by the process of claim 1 into a mould.

13. A process for preparing formed articles made of a polyurethane form, comprising preparing a polyurethane foam by the process of claim 1, wherein said reacting step is conducted in a mould.

14. The process of claim 6, wherein said mixture of polymethylene-polyphenyl polyisocyanates are obtained by phosgenating an aniline-formaldehyde condensate.

15. The process of claim 1, wherein said polyisocyanate is an isocyanic prepolymer prepared by reacting polyisocyanates of the formulas (II) and (III):

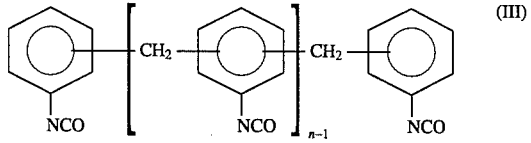

where R represents an aliphatic, a cycloaliphatic, an aromatic, or an alkyl-substituted aromatic radical having 1 to 30 carbon atoms and where n represents an integer higher than or equal to 1;

with an equivalent amount of said polyether polyol and/or said amine of the formula (I), said polyether polyol having a hydroxyl functionality of at least two and a mean molecular weight ranging from 60 to 8,000.

* * * * *